US009821995B2

(12) United States Patent
Pendegraft et al.

(10) Patent No.: US 9,821,995 B2
(45) Date of Patent: Nov. 21, 2017

(54) BEVERAGE DISPENSING SYSTEM WITH BEACON TRANSMITTER AND SYSTEM FOR SELECTIVE PRESENTATION OF PREDETERMINED CONTENT

(71) Applicant: Bevisys, LLC, Roswell, GA (US)

(72) Inventors: James Pendegraft, Clayton, MO (US); Martin Howell, Roswell, GA (US)

(73) Assignee: Bevisys, LLC, Roswell, GA (US)

( * ) Notice: Subject to any disclaimer, the term of this patent is extended or adjusted under 35 U.S.C. 154(b) by 0 days.

(21) Appl. No.: 14/927,001

(22) Filed: Oct. 29, 2015

(65) Prior Publication Data
US 2016/0122172 A1 May 5, 2016

Related U.S. Application Data

(60) Provisional application No. 62/072,821, filed on Oct. 30, 2014.

(51) Int. Cl.
*B67D 1/08* (2006.01)
*B67D 1/14* (2006.01)
*H04B 1/38* (2015.01)
*H04B 1/3827* (2015.01)
*B67D 1/00* (2006.01)

(52) U.S. Cl.
CPC ......... *B67D 1/0888* (2013.01); *B67D 1/1477* (2013.01); *H04B 1/38* (2013.01); *H04B 1/3838* (2013.01); *B67D 2001/0089* (2013.01); *B67D 2210/00081* (2013.01); *B67D 2210/00141* (2013.01)

(58) Field of Classification Search
CPC ...... B67D 1/0888; B67D 1/1477; H04B 1/38; H04W 4/008
See application file for complete search history.

(56) References Cited

U.S. PATENT DOCUMENTS

| 3,043,925 A | 7/1962 | Wilson |
| 5,016,786 A | 5/1991 | Horino et al. |
| 5,491,617 A | 2/1996 | Currie |
| 6,932,638 B1 | 8/2005 | Burrows et al. |
| 9,253,264 B2 | 2/2016 | Robinson et al. |
| 2010/0224273 A1* | 9/2010 | Motley ............... B67D 1/1405 137/801 |
| 2012/0059513 A1* | 3/2012 | Perkins ............... B67D 1/0406 700/244 |
| 2013/0226704 A1 | 8/2013 | Fernandez |

* cited by examiner

*Primary Examiner* — Tuan Pham
(74) *Attorney, Agent, or Firm* — Andrew J. Anderson, Esq.; Harter Secrest & Emery LLP

(57) ABSTRACT

The present system provides a beverage dispensing assembly having a radio transmitter, wherein a personal communication device having associated software receives content from a remote content management system in response to a signal from the transmitter being received at the personal communication device. The radio transmitter may be in a retaining cavity of an extender assembly which is positioned between a faucet and a tap handle of the beverage dispensing assembly.

4 Claims, 3 Drawing Sheets

FIG. 2a
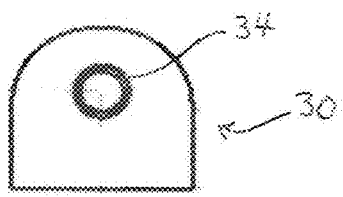
FIG. 2b
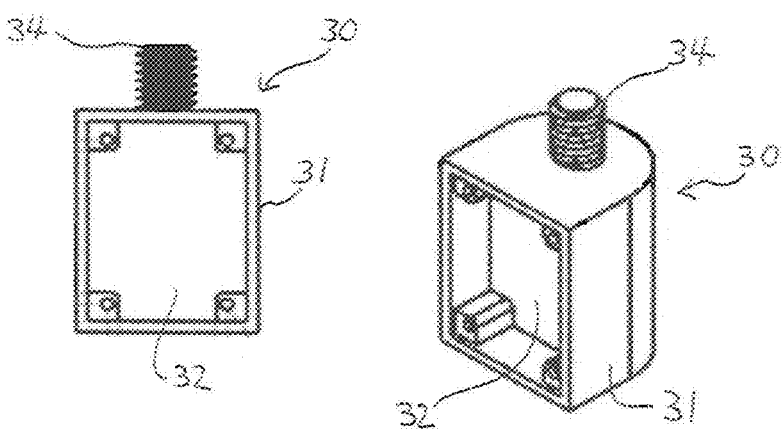
FIG. 2d
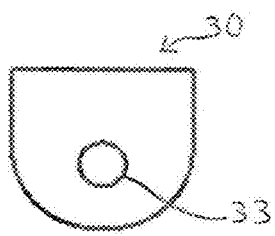
FIG. 2c
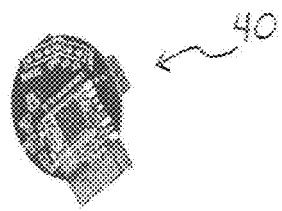
FIG. 3

BEVERAGE DISPENSING SYSTEM WITH BEACON TRANSMITTER AND SYSTEM FOR SELECTIVE PRESENTATION OF PREDETERMINED CONTENT

BACKGROUND

The present disclosure generally relates to a beverage dispensing assembly having a communications module, and more particularly in certain embodiments to an extender assembly having a communications module, such as a beacon transmitter, for use in such a beverage dispensing assembly. The disclosure further relates to a system including such a beverage dispensing assembly, a remote content management system, and a selectively programmed personal communication device having a software development kit for communication between the beverage dispensing assembly and the personal communication device, and between the personal communication device and the remote content management system, wherein selected content from the remote content management system may be transmitted to the personal communication device.

Beverage dispensing assemblies, and in particular draught beer dispensing tap assemblies, typically comprise a faucet body having an inlet and a spout, and a valve lever projecting from the faucet body and moveable between a closed position and an open position to selectively pass beverage from the inlet to the spout. A tap handle frequently may further be operatively connected to the valve lever for more easily controlling a position of the valve lever. While such beverage dispensing assemblies are typically manually operated and do not need any electrical connections, tap handles in a tap assembly have employed fiber optic cables to illuminate portions of the tap and handle and have included quick release electrical connections surrounding a threaded core. Such devices are shown, e.g., in U.S. Pat. Nos. 6,932,638; 5,491,617 and 3,043,925.

However, the need remains for a beverage dispensing assembly that can wirelessly communicate with a portable communication device and wherein predetermined content is provided, from a remote source, to the portable communication device corresponding to a parameter of the location of the portable communication device relative to the beverage dispensing assembly.

BRIEF SUMMARY OF THE INVENTION

In one embodiment, an extender assembly for a beverage dispensing tap assembly having a faucet with a projecting threaded shaft and a tap handle having a threaded receptacle is described, the extender assembly comprising: a housing having a retaining cavity, a threaded recess configured to cooperatively engage the projected threaded shaft and a projecting threaded stud configured to be cooperatively received in the threaded receptacle of the tap handle; and a self-contained radio transmitter at least partly retained within the cavity.

In another embodiment, a beverage dispensing tap assembly is described, comprising: a faucet body having an inlet and a spout, and a valve lever projecting from the faucet body and moveable between a closed position and an open position to selectively pass beverage from the inlet to the spout; optionally an extender assembly connected to the valve lever; a tap handle operatively connected either to the valve lever or to the optional extender assembly, when present, for controlling a position of the valve lever; and a radio transmitter connected to or contained in one of the faucet body, the optional extender assembly when present, and the tap handle.

In a further embodiment, a method is described comprising: unthreading a tap handle from a threaded valve lever of a beverage dispensing tap faucet; threadingly engaging an extender body with the threaded valve lever; threadingly engaging the tap handle with a projecting threaded bolt of the extender body; and transmitting a radio signal from a transmitter carried by the extender body.

In a still further embodiment, a method of providing content to a portable personal communication device (PCD) is described, the method comprising: receiving, at a PCD, a short range radio signal from a beverage dispensing assembly; transmitting, in response to the received signal from the beverage dispensing assembly, a signal from the PCD to a remote content management system; and receiving, at the PCD, content from the remote content management system, wherein the content corresponds to the received signal from the beverage dispensing assembly.

BRIEF DESCRIPTION OF THE SEVERAL VIEWS OF THE DRAWING(S)

FIGS. 2a-2d illustrate top, side, bottom, and an angled perspective view, respectively, of an extender assembly in accordance with one embodiment of the invention;

FIG. 3 illustrates a beacon transmitter which may be used in various embodiments of the invention.

DETAILED DESCRIPTION OF THE INVENTION

In one configuration, the present disclosed system includes a beverage dispensing assembly, a software development kit (SDK) and a content management system (CMS).

With respect to the beverage dispensing assembly, one configuration includes a beer dispensing tap assembly having a faucet body, a valve assembly, a tap handle, and a radio transmitter.

The faucet body of the beverage dispensing assembly can be any configuration as known in the art having an inlet and a spout. The inlet is fluidly connected to a source of the beverage, such as a keg as known in the art. More particularly as shown in FIG. 1, a faucet body 10 having an inlet 11 and a spout 12, and a valve lever 13 projecting from the faucet body may be employed, where the valve lever is moveable between a closed position and an open position to selectively pass beverage from the inlet to the spout.

While the specific form of the faucet is not restricted thereto, a conventional beer dispensing faucet assembly which may be employed may be a known manual dispensing valve having a foaming function, such as depicted, e.g., in FIGS. 31, 32a and 32b of U.S. Pat. No. 5,016,786, the disclosure of which is incorporated by reference herein in its entirety. Such beer dispensing valve includes a valve body, a valve stem slideably provided within the valve body and a lever for sliding the valve stem, the valve stem having a valve provided at a front end thereof, the valve being engaged with and disengaged from a valve seat of the valve body (faucet body) to perform a valve action. The valve assembly may further more particularly include a packing retaining member slideably fitted in the front end of the valve stem and a packing held by the packing retaining member and a compression coil intermediate the packing retaining member and a nut threadedly mounted on the front end of the valve stem. The nut is formed at the front thereof with a beer introducing aperture and the valve stem is also formed with a foaming hole.

Figure 1:
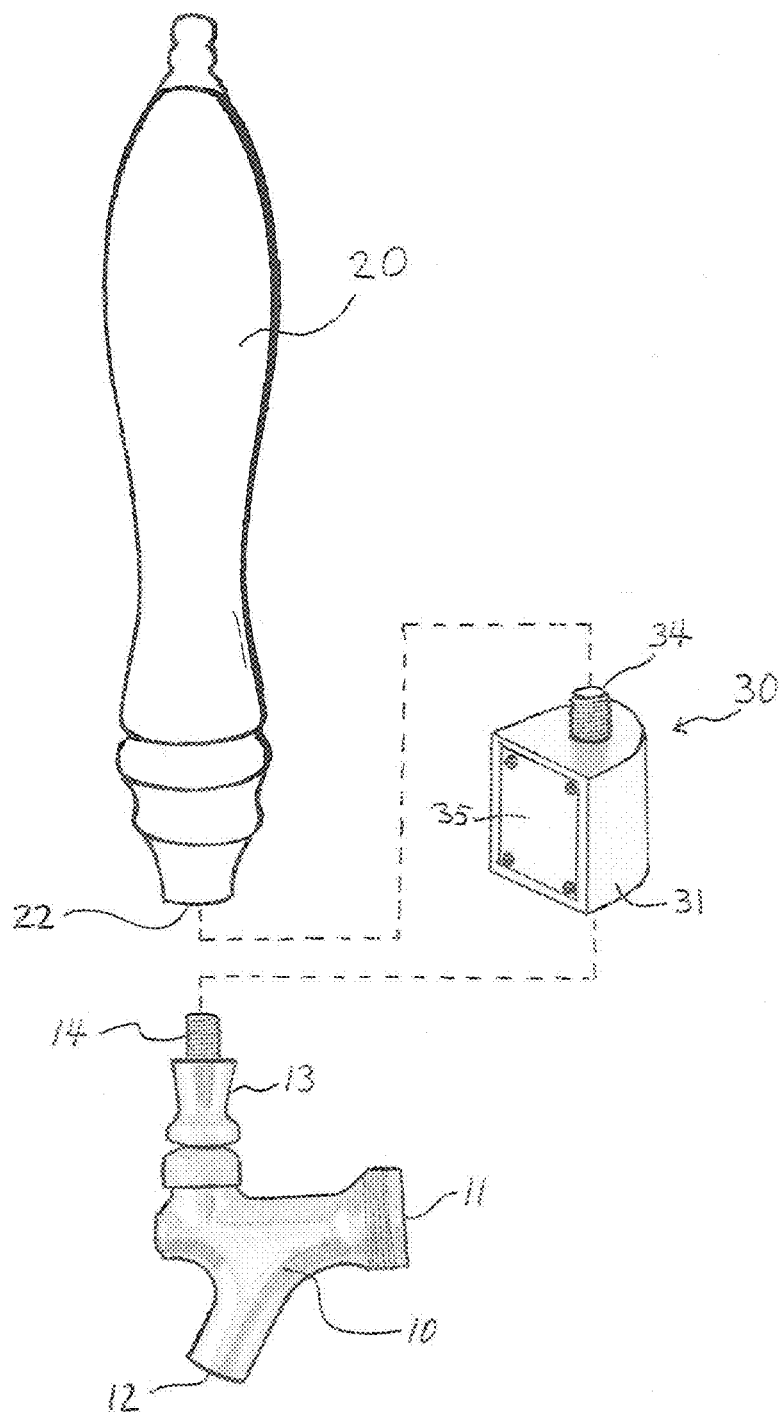
FIG. 1 illustrates a faucet, extender assembly, and tap handle of a beverage dispensing assembly in accordance with one embodiment of the invention.

As further shown in FIG. 1, the valve lever 13 projects from the faucet body, and typically includes a projecting threaded bolt 14 sized to be cooperatively engaged with an interchangeable handle tap handle 20 as shown. The tap handle 20 can be any of a variety of sizes from less than 2 inches to 24 inches or more. The tap handle typically includes a threaded socket 22 configured to cooperatively engage the threaded bolt 14 of a valve lever. As known in the art, the tap handle can include printed advertising or labeling for the corresponding dispensed beverage.

In one configuration, also illustrated in FIG. 1, the beverage dispensing assembly further may include an extender assembly 30, wherein the extender assembly is located intermediate the faucet body and the tap handle.

As shown in FIGS. 2a-2d (where FIG. 2a shows a top view, FIG. 2b shows a side view, FIG. 2c shows a bottom view, and FIG. 2d shows an angled perspective view of extender assembly 30), the extender assembly 30 includes a housing 31 having a retaining cavity 32, a threaded recess 33 configured to cooperatively engage the threaded shaft of the lever of the valve assembly, and a projecting threaded stud 34 configured to be cooperatively received within the threaded socket of the tap handle. In a particular embodiment, a radio transmitter 40, as shown in FIG. 3, is retained in cavity 32. As shown in FIG. 1, a panel or cover 35 may be employed to enclose retaining cavity 32 of extender assembly 30.

In further configurations, it is contemplated the radio transmitter 40 can alternatively be cooperatively engaged, retained and/or embedded in or on any of the faucet body, the extender assembly, or the tap handle, thereby making the use of an extender assembly optional.

For example, the tap handle could be manufactured with the radio transmitter either embedded in the handle or having a recess or pocket sized to cooperatively receive and retain the radio transmitter in the tap handle. Use of an extender assembly with a radio transmitter retained therein, however, may be particularly useful in certain embodiments of the present invention, as more particularly described herein.

When an extender assembly is employed in certain embodiments, the radio transmitter is at least partly retained within the cavity of the extender housing. However, as set forth above it is understood, the radio transmitter can be cooperatively retained by any of the faucet body, the valve assembly or the tap handle as well as the extender.

In one configuration, the radio transmitter 40 is a self-contained unit having a power source such as a battery in addition to a radio signal transmitter, so that external electrical connections to the radio transmitter are avoided.

In one configuration, the radio transmitter acts substantially as a beacon emitting a signal at a predetermined interval or time. Various commercially available beacon radio transmitters, typically employing a BlueTooth™ Low Energy (BLE) transmitter, are readily available and may be employed in the present invention. The transmitter more specifically may employ Apple's iBeacon™ technology, which employs standardized protocol across iOS and Android personal communication devices. Commercially available low-cost, low-power BLE wireless radio transmitters which may be employed in the present invention include, e.g., System-on-Chip (SoC) Smart Beacons marketed by Nordic Semiconductor. These transmitters can operate between 5 kilohertz to 30 gigahertz with a more preferred range between 915 megahertz and 2.4 gigahertz. The radio transmitter can include integrated RF ICs as known in the art.

The desired strength of the radio transmitter beacon signal can be programmed into the radio transmitter. In one configuration, the radio transmitter is configured to transmit a signal up to approximately 100 meters, and in select configurations, approximately 70 meters. In one configuration, the radio transmitter includes a power supply, such as a battery (e.g., a CR2032 battery, which can provide for continuous operation of the radio transmitter between approximately three to five years.

In one configuration, the radio transmitter beacon is configured to transmit beacon identifying codes, which can include a plurality of tiers, or categories so that multiple beacons can be classified within a common family or category, yet each retain a beacon unique identification. For example, the beacon signal can include a universally unique identifier, a major and a minor value.

In either the extender configuration or the tap handle carrying the radio transmitter configuration, the existing tap handle is unthreaded from the lever of the valve assembly and either the extender housing with a transmitter or the new tap handle with a transmitter is threadingly engaged with the lever. In the extender configuration, the existing handle may then be threadingly engaged with the extender assembly, thereby reattaching the handle to the tap assembly.

Accordingly, in one specific embodiment the invention comprises a method of unthreading a tap handle from a threaded valve lever of a beverage dispensing tap faucet; threadingly engaging an extender assembly with the threaded valve lever; threadingly engaging the tap handle with a projecting threaded bolt of the extender assembly; and transmitting a radio signal from a transmitter carried by the extender assembly.

Embodiments of the invention employing an extender assembly with a radio transmitter retained therein may be particularly useful in that the extender assembly may comprise standard treaded bolts and receptacles (typically ⅜" thread) matching the treaded shaft of a conventional beverage dispensing assembly valve lever, and threaded receptacle of a standard tap handle, and thus be retro-fitable with existing conventional beverage dispensing tap assemblies. When installed, the radio transmitter in the extender assembly thus becomes essentially fixed in place, and not easily displaced. Additionally, placement of the radio transmitter in an extender assembly of a beverage dispensing apparatus provides line of sight which allows for advantageous transmission (e.g., 360 degrees around beverage dispensing tap to broadcast signal). Use of an extender assembly with radio transmitter contained therein further advantageously provides for consistency in placement of radio transmitters in a campaign, providing ease in locating the transmitter for operational management. Positioning of the transmitter in an extender assembly further enables incorporating further features if desired, such as including temperature or acceleration sensors to measure temperature or acceleration (i.e., detect each movement of the tap handle).

Figure 4:
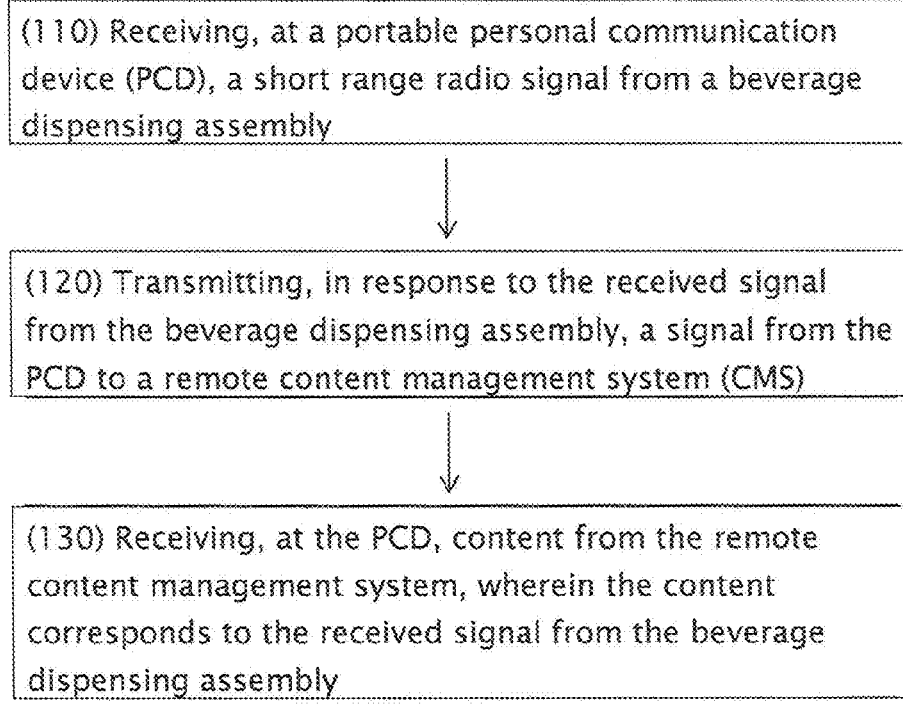
FIG. 4 is a flow chart illustrating steps in a method of providing content to a portable personal communication device in accordance with an embodiment of the invention.

In a further embodiment, the invention is directed towards a method of providing content to a portable personal communication device (PCD), the method as show in FIG. 4 including the steps of (110) receiving, at a PCD, a short range radio signal from a beverage dispensing assembly; (120) transmitting, in response to the received signal from the beverage dispensing assembly, a signal from the PCD to a remote content management system (CMS); and (130) receiving, at the PCD, content from the remote content management system, wherein the content corresponds to the received signal from the beverage dispensing assembly.

The personal communication device (PCD) may be programmed with a software development kit (SDK) which provides for a standalone application (app) carried by the PCD of a user or a component embedded into an existing app on a PCD. The PCD can be any of a variety of configurations which provide wireless communication and capability to send and receive data using short wavelength UHF radio waves. The specific configuration of the PCD can be any configuration such as a phone, tablet, computer, laptop or a watch.

The SDK is code that provides certain functionality in providing a link between a beacon transmitter and a remotely located content management system. The SDK, via the receiving capability of the PCD, receives the signal transmitted from the beacon transmitter. That is, the SDK monitors for the presence of a transmitted signal from the beverage dispensing tap assembly.

The PCD and the embedded app can be configured to respond to a variety of triggers, such as zone or location dependent from the radio transmitter. For example, as the strength of the transmitter radio signal decreases at a known rate corresponding to a distance from the transmitter, the app and hence the PCD can identify their distance from the radio transmitter, and hence tap assembly.

Alternatively, the app in the PCD can monitor a length of time within a relative proximity to the tap assembly. That is, by monitoring the relative strength of the signal and a corresponding timer in the app, the length of time the PCD is within a given distance of the tap assembly can be monitored. Further, it is contemplated transitions from one level of proximity to another level of proximity to the tap assembly can be determined by the app in the PCD. It is contemplated that any of a variety of combinations of these triggers can be employed.

Thus, the app (or code within a host app) can effectively awaken or change the mode state of the PCD upon sensing the signal from the beverage dispensing assembly. The app can thus connect the PCD with a remotely located content management system (CMS). Further, it is contemplated that the app can control the presentation of the content in coordination with or independent of the content management system. That is, certain messages or content can be stored on the PCD via the app or can be transmitted wirelessly from the cloud and the content management system.

The content management system may include a web portal that allows a marketer to customize and control content that is to be delivered to the PCD in conjunction with the SDK app installed on the PCD. Basic functions of a remote content management system and SDK app that may be employed in the present invention include those described, e.g., in US 2013/0226704, the disclosure of which is incorporated by reference in its entirety.

It is contemplated, e.g., the web portal would allow content providers/marketers to vary messages depending on a variety of parameters including: account type; Distributor; DMA (Designated Marketing Area); marketing area (for example, bar district); and/or by account; and can provide content such as: images; video; links to sites; and/or text.

Further, the content management system can cooperate with the app on a given PCD to determine when messages are provided to the PCD, such as by: specific dates or ranges; Days of the week; Time(s) of a specific day, date or range; time or periods of the day; or proximity conditions.

Thus, messages relating to: brand equity; marketing campaigns; event messages; account promotions; tasting notes or information; responsible use; and contest entries, e.g., can be pushed to or displayed from the app on the personal communication device as the personal communication device satisfies the predetermined triggers.

Thus, the present system provides an interactive mechanism for providing content to a personal communication device corresponding to a parameter of the personal communication device relative to the beverage dispensing assembly, such as a beer tap assembly.

For example, the SDK controlling selected functionality of the PCD receives the beacon signal from a beverage dispensing assembly and, in selected configurations, the identifying codes for the beacon. The SDK then communicates with the content management system (CMS) to provide the identification codes, as well as an app identifier of the app associated with the particular instance of the SDK and a PCD identifier. In addition, the SDK can employ a global positioning system (GPS) capability of the PCD to transmit a latitude-longitude of the PCD upon receiving the beacon signal to the CMS.

The SDK can present a primary message on a display of the PCD and upon predetermined user interaction or input then display a secondary message as provided by the CMS.

The CMS receives the signals from the PCD and capture certain data relating to the event such as time/date, beacon properties, location of the beacon (which can be compared to a previously known or intended location of the beacon, an identification of the associated app as well as an identification of the associated (or hosting) PCD.

Then based upon satisfaction of criteria with the CMS, the CMS provides selected data such as video, text, audio or URLs to the SDK and hence PCD. The SDK can provide for selective display of the content, including retention parameters of the content on the PCD.

The CMS includes an assignment of a given beacon to a given client or market. The CMS can include a variety of permission levels for allowing the addition and modification of content to be provided to the SDK. Thus, the client can assign certain access to certain members so that content can be appropriately controlled and updated.

It is contemplated each radio transmitter location and various qualifying criteria are retained in a database, such as the content management system, wherein the transmitter and tap assembly can be classified by geographical location; type of bar or restaurant; a brand of associated beverage; hours of operation of the associated establishment; as well as a vicinity to event venues such as stadiums, concert halls, hotels, restaurants or even other bars or beverage distributions points.

In addition to a radio signal transmitter, radio transmitter 40 further may include additional conventional electronics components to provide further functionality such as a communication interface, processor, a temperature sensor, an accelerometer, and/or memory.

In further embodiments, e.g., upon sensing a predetermined threshold of power from the power supply, the radio transmitter can send a corresponding signal, via a PCD, which is received by the content management system. Additionally or alternatively, the content management system can be configured to recognize a lack of communication from any PCD in the zone of the given beverage dispensing system as indicating a low power level for the radio transmitter employed in the given beverage dispensing system, and a replacement power supply can be installed.

In still further embodiments, the transmitter 40 placed in or on an extender assembly or tap handle may include an accelerometer to sense movement of the valve lever and tap handle, and send a single which indicates each such movement. If the transmitter includes a memory unit, the number of movements may be stored in memory, and accessed from the memory when convenient. Alternatively, a separate signal receiver with memory may be located near the beverage dispenser assembly, and receive and store the movement signals provided by the ratio transmitter. Where multiple taps are provided with separate radio transmitters, the relative movement activity of each tap may thus be advantageously monitored and tracked based on the signals transmitted as a result of the accelerometers sensing movement of each individual tap handle.

While the invention has been described in connection with several specific embodiments thereof, those skilled in the art will appreciate that many modifications and changes may be made without departing from the true spirit and scope of the invention which accordingly is intended to be defined solely by the appended claims.

The invention claimed is:

1. A method of providing content to a portable personal communication device (PCD), the method comprising:
    (a) receiving, at a PCD, a short range radio signal from a beverage dispensing assembly;
    (b) transmitting, in response to the received signal from the beverage dispensing assembly, a signal from the PCD to a remote content management system; and
    (c) receiving, at the PCD, content from the remote content management system, wherein the content corresponds to the received signal from the beverage dispensing assembly;
    wherein the short range radio signal from the beverage dispensing assembly is sent from a transmitter located in an extender assembly connected between a tap handle and a tap faucet of the beverage dispensing assembly;
    and wherein the tap faucet has a projecting threaded shaft, the tap handle has a threaded receptacle, and the extender assembly comprises:
    (i) a housing having a retaining cavity, a threaded recess configured to cooperatively engage the projected threaded shaft and a projecting threaded stud configured to be cooperatively received in the threaded receptacle of the tap handle; and
    (ii) a self-contained radio transmitter at least partly retained within the cavity.

2. The method of claim 1, wherein the beverage dispensing assembly is a draught beer tap assembly.

3. The method of claim 1, wherein the content from the remote content management system includes at least one of video content, audio content, text content, a link and a URL.

4. The method of claim 1, wherein the content corresponds to a distance between the beverage dispensing assembly and the PCD.

\* \* \* \* \*